United States Patent
Anandan et al.

(10) Patent No.: US 12,444,750 B2
(45) Date of Patent: Oct. 14, 2025

(54) ELECTRODES WITH ACTIVE MATERIAL PARTICLES HAVING MIXED IONIC AND ELECTRONIC CONDUCTING LAYERS THEREON

(71) Applicant: Ford Global Technologies, LLC, Dearborn, MI (US)

(72) Inventors: Venkataramani Anandan, Farmington Hills, MI (US); Chanyeop Yu, Columbus, OH (US); Jung-Hyung Kim, Columbus, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 308 days.

(21) Appl. No.: 17/547,953

(22) Filed: Dec. 10, 2021

(65) Prior Publication Data

US 2022/0102729 A1     Mar. 31, 2022

Related U.S. Application Data

(62) Division of application No. 16/265,312, filed on Feb. 1, 2019, now Pat. No. 11,211,613.

(51) Int. Cl.
| | |
|---|---|
| H01M 4/62 | (2006.01) |
| H01M 4/36 | (2006.01) |
| H01M 10/0525 | (2010.01) |
| H01M 10/0585 | (2010.01) |

(52) U.S. Cl.
CPC ........... *H01M 4/628* (2013.01); *H01M 4/366* (2013.01); *H01M 10/0525* (2013.01); *H01M 10/0585* (2013.01)

(58) Field of Classification Search
CPC .. H01M 4/0421; H01M 4/0471; H01M 4/139; H01M 4/366; H01M 4/48; H01M 4/58; H01M 4/5815; H01M 4/5825; H01M 4/621; H01M 4/624; H01M 4/628; H01M 10/0562

See application file for complete search history.

(56) References Cited

U.S. PATENT DOCUMENTS

| | | | |
|---|---|---|---|
| 6,605,316 B1 | 8/2003 | Visco et al. | |
| 6,767,662 B2 | 7/2004 | Jacobson et al. | |
| 6,921,557 B2 | 7/2005 | Jacobson et al. | |
| 11,183,691 B2* | 11/2021 | Park | H01M 4/131 |
| 2011/0065006 A1 | 3/2011 | Ogasa | |
| 2015/0318530 A1* | 11/2015 | Yushin | H01M 10/36 429/131 |
| 2017/0170515 A1* | 6/2017 | Yushin | H01M 4/582 |
| 2018/0219229 A1* | 8/2018 | Miki | H01M 10/0525 |

FOREIGN PATENT DOCUMENTS

| | | | |
|---|---|---|---|
| JP | 2011-192499 | * | 9/2011 |
| WO | WO 2015-170481 | * | 11/2015 |

OTHER PUBLICATIONS

English translation of JP Publication 2011-192499, Sep. 2011.*

* cited by examiner

*Primary Examiner* — Brittany L Raymond
(74) *Attorney, Agent, or Firm* — David B. Kelley; Brooks Kushman P.C.

(57) ABSTRACT

A solid-state battery includes an anode, a cathode, and a solid electrolyte between the anode and cathode. The anode or cathode includes bonded active material particles having thereon a mixed ionic and electronic conducting conformal interface layer that provides a transport path for ions and electrons during operation of the solid-state battery, and lacks solid electrolyte particles.

10 Claims, 2 Drawing Sheets

ELECTRODES WITH ACTIVE MATERIAL PARTICLES HAVING MIXED IONIC AND ELECTRONIC CONDUCTING LAYERS THEREON

CROSS-REFERENCE TO RELATED APPLICATION

This application is a division of U.S. application Ser. No. 16/265,312, filed Feb. 1, 2019, the disclosure of which is hereby incorporated in its entirety by reference herein.

TECHNICAL FIELD

This disclosure is related to structures and fabrication techniques for solid-state batteries, such as lithium-based, magnesium-based, potassium-based, sodium-based, and zinc-based solid-state batteries.

BACKGROUND

The combustion engine has been the most common propulsion system of transportation in modern society. As the combustion process in the engine leads to an emission of greenhouse gas, there has been growing concern about air pollution and global warming with increasing numbers of vehicles that are concentrated in metropolitan areas. In this regard, automakers have been devoted to vehicle electrification, by implementing energy storage systems in vehicles, which can significantly reduce or even eliminate emissions depending on the types of electric vehicles (EVs).

Among various energy storage systems, rechargeable lithium-ion batteries (LIBs) have been adopted for EV applications due to its high energy density and reasonable cycle life and cost. Besides the transportation sector, LIBs have been widely utilized or seriously considered as energy storage devices in other industrial fields such as small electronics and grid energy storage, which resulted in rapid growth of commercial LIB productions and lowering the costs in the last decade.

Despite these promising aspects of LIBs, several challenges remain mainly originated from fundamental limitations of LIB technology. First, the energy density of LIBs needs to be increased to satisfy practical requirements of EVs, although it still provides large energy density superior to other energy storage technologies. Current commercial battery electric vehicles (BEVs or all-electric vehicles) offer traveling distances ranging from 100 to 200 miles per single charging, which is less than that of traditional vehicles (propulsion from combustion engine only) that offers approximately over 400 miles on a single tank of gas. Second, liquid electrolytes in LIBs can experience thermal issues under abusive conditions because of their organic solvents.

SUMMARY

A solid-state battery includes an anode, a cathode, and a solid electrolyte between the anode and cathode. The anode or cathode include solid electrolyte particles bonded with active material particles including thereon a mixed ionic and electronic conducting conformal interface layer resulting from diffusion of dopant within the solid electrolyte particles or active material particles toward a surface of the active material particles and reaction of the dopant with the solid electrolyte particles. The solid electrolyte particles may be sintered with the active material particles. The mixed ionic and electronic conducting conformal interface layer may be configured to provide a transport path for ions and electrons during operation of the solid-state battery. The solid electrolyte particles may be oxides, polymers, or sulphides. The active material particles may be intercalation active material particles or conversion active material particles.

A solid-state battery includes an anode, a cathode, and a solid electrolyte between the anode and cathode. The anode or cathode include bonded active material particles having thereon a mixed ionic and electronic conducting conformal interface layer configured to provide a transport path for ions and electrons during operation of the solid-state battery, and lack solid electrolyte particles. The bonded active material particles may be sintered. The active material particles may be intercalation active material particles or conversion active material particles. The mixed ionic and electronic conducting conformal interface layer results from reaction of layers of metal oxide, metal phosphate, metal silicate, or metal sulfide with the active material particles during bonding. The layers may be lithiated. The active material particles may contain dopants.

A method of making a solid-state battery includes coating active material particles with a layer of metal oxide, metal phosphate, metal silicate, or metal sulfide to form coated active material particles, sintering the coated active material particles such that the layer reacts with the active material particles resulting in mixed ionic and electronic conducting conformal interface layers on the active material particles to form an electrode, and arranging the electrode in contact with a solid electrolyte. The coating may be applied via sol gel or vapor deposition. The layer may be lithiated. The active material particles may be intercalation active material particles or conversion active material particles. The solid-state battery may be a lithium-ion solid state battery or a sodium-ion solid state battery.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Recently, all solid-state LIBs have been highlighted as the next generation battery technology attributed to its attractive merits. An all solid-state battery includes solid electrolytes that replace liquid electrolytes and separators. Since it does not involve liquid, it is completely free from thermal runaway. In addition, all solid-state batteries can offer more simple system design and versatile form factor that will improve engineering manufacturability. It allows the adoption of metallic anodes in the cells, which will significantly increase energy density. In pack-scale, all solid-state batteries can be downsized through simplification of battery pack designs. For instance, certain all solid-state batteries may be able to have thinner exterior cases, allowing simple battery pack design compared with conventional LIBs.

The commercialization of all solid-state LIBs, however, has been delayed due to several technical challenges. One major obstacle is caused by poor solid-solid contacts between electrode and solid electrolyte materials. In conventional LIBs, it is not considered an issue because liquid electrolytes maintain good solid-liquid contact. By contrast, in all solid-state LIBs, making a good solid-solid contact at the electrode-electrolyte interface is difficult. Lack of providing such a good interface results in an increase in cell impedance and subsequent cell issues.

Figure 1A:
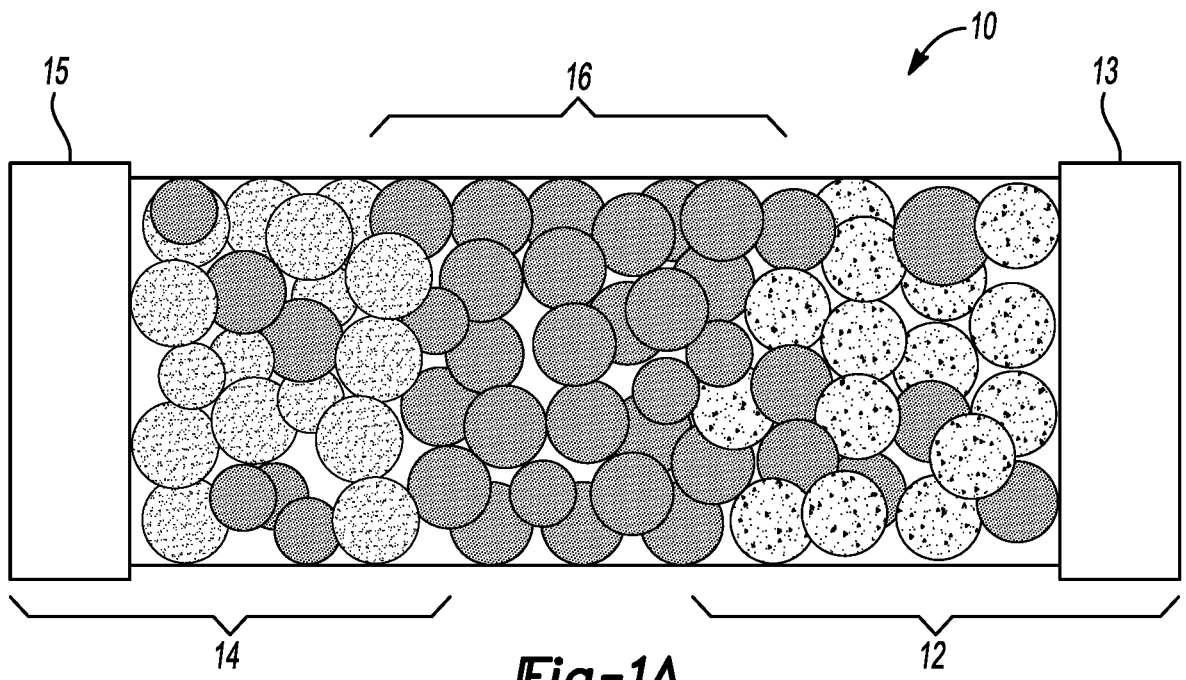
FIG. 1A is a schematic diagram of a solid-state battery.
Figure 1B:
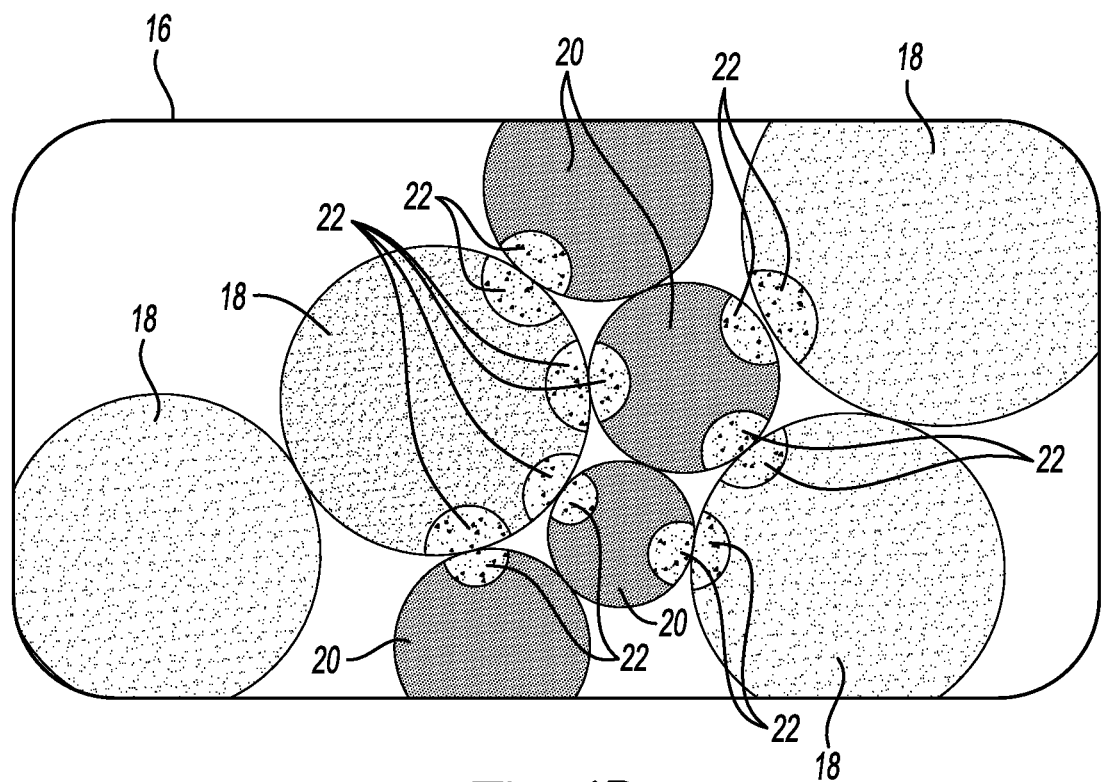
FIG. 1B is a schematic diagram of the solid electrolyte of the solid-state battery of FIG. 1A FIGS. 2 and 3 are schematic diagrams of solid electrolytes.

To address this issue, the electrode-electrolyte components of ceramic all solid-state LIB cells are sintered at elevated temperatures to grow particles and enlarge contact area of particles. With reference to FIG. 1A, a solid-state battery 10 includes an anode 12 and associated current collector 13, a cathode 14 and associated current collector 15, and a solid electrolyte 16. And with reference to FIG. 1B, the solid electrolyte 16 includes active material particles 18 and solid electrolyte particles 20. Electrolytes based on metal oxides require high temperature for the sintering process (roughly over 600° C.). The sintering process at elevated temperatures, however, leads to another problem. Electrode and electrolyte materials can react with each other (so-called side reactions) at high temperatures, and form byproducts 22 at the electrode-electrolyte interface. Most of the byproducts are electrochemical insulators that impede transportations of charge carriers during battery operation, which results in high resistance of the cells. In addition, as a typical approach to all solid-state LIBs, the cathode is fabricated as a composite of active material, a solid electrolyte, and an electronic conductor ("composite electrode" hereafter). But, incorporation of solid electrolytes (around from 30 to 50 wt. %) in such composite cathodes leads to a commensurate decrease in the energy density of the battery. To address these issues, we attempt to enhance the energy density of the battery and lower the cost by proper design and control of the electrode and electrolyte interfaces in composite electrodes.

Figure 2:
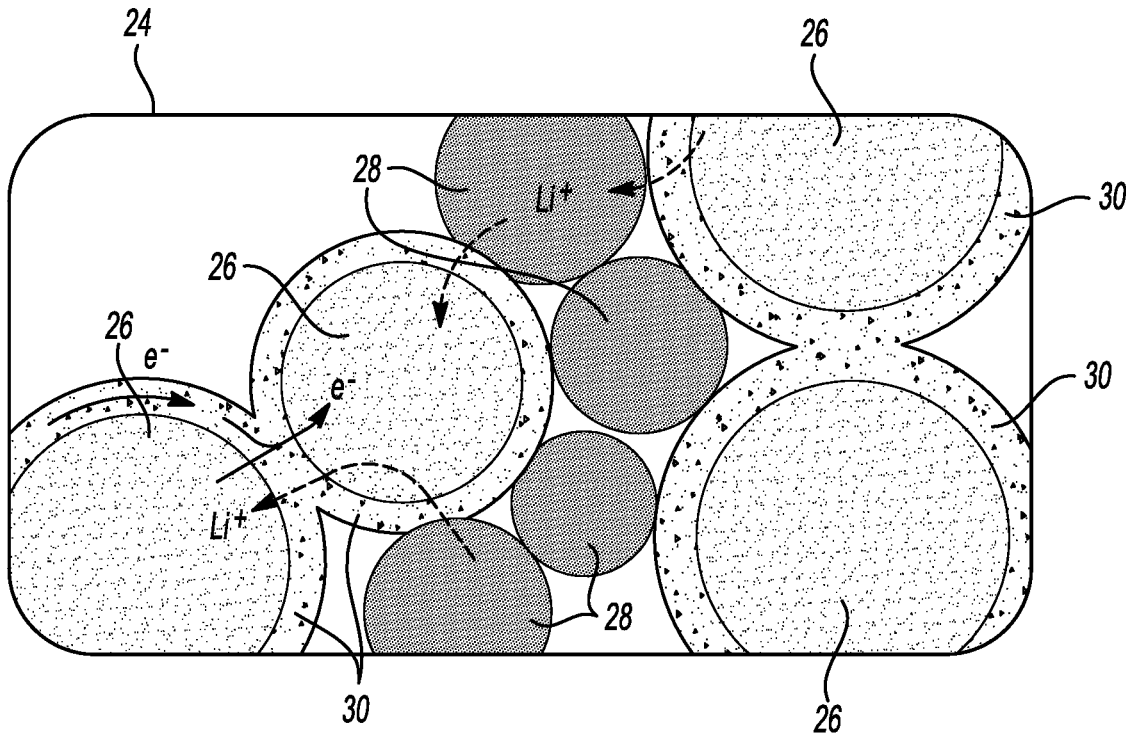

Here, we propose two different composite electrode designs that could reduce the interfacial resistance while improving the energy density. In a first configuration, composite electrodes are tailored to form mixed Li ionic and electronic conducting (MIEC) interface layers between the active and solid electrolyte materials. The MIEC layer will not only stabilize the interface, but also facilitate the Li ion and electron transfer between the particles. In addition, the MIEC will reduce the amount of electronic component and solid electrolyte present in the composite resulting in increase of energy density. To fabricate this design, either the active material/solid electrolyte or both are doped with a suitable dopant. The dopant will be selected based on the desired properties of the MIEC. During the sintering process, dopant will diffuse onto the surface and aid the formation of the MIEC layer between the active and solid electrolyte material. With reference to FIG. 2, an electrode 24 (anode or cathode) arranged according to the first configuration includes active material particles 26 (intercalation active material particles or conversion active material particles), solid electrolyte particles 28 (inorganic, sulphides, or polymers), and an MIEC interlayer 30 on the active material particles 26.

Figure 3:
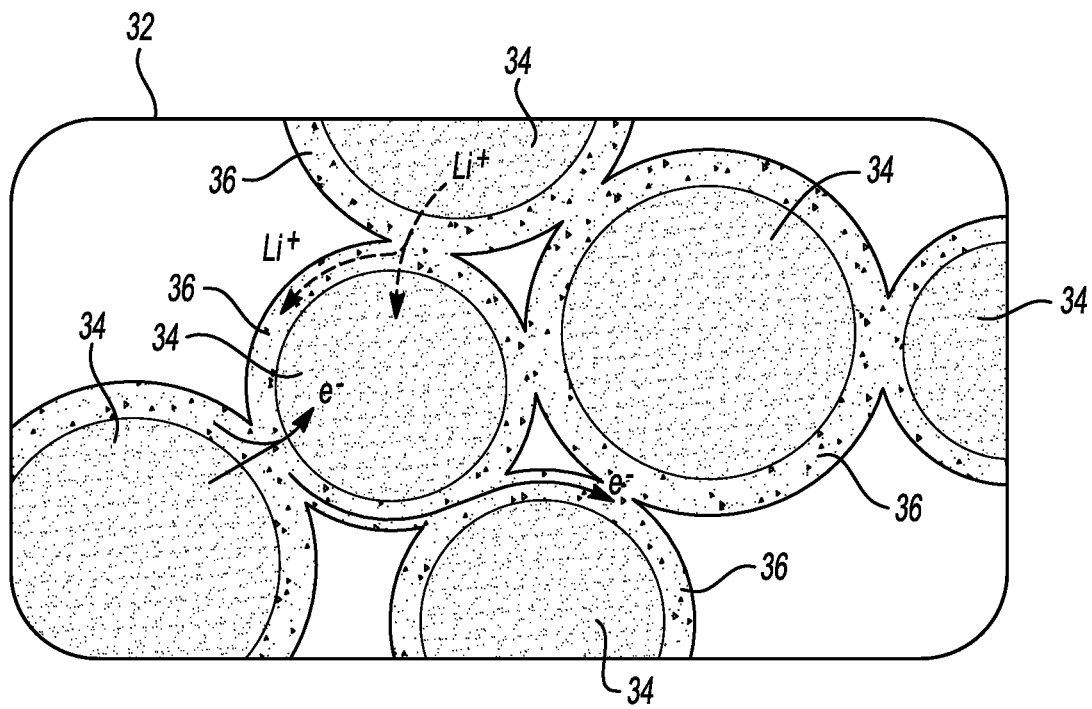

In a second configuration, the solid electrolyte and electronic conducting material is eliminated from the composite, which is replaced by a thin layer of MIEC on the surface of active material. MIEC will provide the function of both ionic and electronic conduction in the composite. Elimination of both the solid electrolyte and electronic conducting phase will increase energy density significantly—approximately 35 (v/v %) compared to a composite electrode having 35 (v/v %) of electrolyte and electronic conduction materials. This design could be fabricated by coating the active material with a thin layer of suitable material composition. Coating could be done using different methods such as sol gel, vapor deposition, etc. During the sintering of coated active material, the active material will react with the coating to form MIEC on the surface. For example, layers of lithiated metal oxide, lithiated metal phosphate, lithiated metal silicate, lithiated metal sulfide, or their ingredients with appropriate ratio between lithium, metal, oxide, phosphate, or sulfide will be coated on active materials. These materials will be densified and/or transformed into the target MIEC phase through a limited reaction with surficial active materials during sintering at elevated temperatures. With reference to FIG. 3, an electrode 32 arranged according to the second configuration includes active material particles 34 and an MIEC interlayer 36 on the active material particles 34. The conformal coating of the MIEC 34 will network Li ions and electrons across the electrode.

The above configurations stabilize the electrode and electrolyte in all solid-state batteries and improve energy density. By suppressing the formation of insulating by-products at the interfaces, all solid-state batteries can maintain low cell impedance and thereby offer stable battery performance. In addition, with the second configuration described above, the energy density of the solid-state battery can increase significantly by eliminating the portion of electrolyte and electronic conducting material—approximately 35% compared with composite cathodes having 30% electrolyte portion for example.

The solid-state batteries contemplated herein can be used as a unit cell of a battery module or pack for small to large-scaled devices requiring large capacity, high stability, and long cycle retention characteristics. Moreover, they are applicable to wide fields of industries, for example, mobile phones, smart phones, laptops, power tools powered by electric motors, electric vehicles, hybrid electric vehicles, plug-in hybrid electric vehicles, electric motorcycles including E-bikes and E-scooters, electric golf carts, etc.

The words used in the specification are words of description rather than limitation, and it is understood that various changes may be made without departing from the spirit and scope of the disclosure and claims. Certain examples herein are discussed within the context of lithium-ion technology. Sodium-ion technology and other technology, however, are also contemplated.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A solid-state battery comprising:
   an anode;
   a cathode; and
   a solid electrolyte between the anode and cathode, the anode or cathode including bonded active material particles having thereon a mixed ionic and electronic conducting conformal interface layer (i) resulting from reaction of the active material particles with a layer of metal oxide, metal phosphate, metal silicate, or metal sulfide during bonding and (ii) configured to provide a transport path for ions and electrons during operation of the solid-state battery, and lacking solid electrolyte particles.

2. The solid-state battery of claim 1, wherein the bonded active material particles are sintered.

3. The solid-state battery of claim 1, wherein the active material particles are intercalation active material particles or conversion active material particles.

4. The solid-state battery of claim 1, wherein the layer is lithiated.

5. The solid-state battery of claim 1, wherein the active material particles contain dopants.

6. A method of making a solid-state battery, comprising:
   coating active material particles with a layer of metal oxide, metal phosphate, metal silicate, or metal sulfide to form coated active material particles;
   sintering the coated active material particles such that the layer reacts with the active material particles resulting in mixed ionic and electronic conducting conformal interface layers on the active material particles to form an electrode; and
   arranging the electrode in contact with a solid electrolyte.

7. The method of claim 6, wherein the layer is applied via sol gel or vapor deposition.

8. The method of claim 6, wherein the layer is lithiated.

9. The method of claim 6, wherein the active material particles are intercalation active material particles or conversion active material particles.

10. The method of claim 6, wherein the solid-state battery is a lithium-ion solid state battery or a sodium-ion solid state battery.

* * * * *